United States Patent [19]

Kawano et al.

[11] Patent Number: 4,879,445
[45] Date of Patent: Nov. 7, 1989

[54] SEAM WELDING APPARATUS WITH EDGE DETECTION

[75] Inventors: Hitoshi Kawano; Mitsuhiro Hayashi; Yukio Yamamoto; Kunikatsu Ban, all of Ise, Japan

[73] Assignees: N.P.W. Technical Laboratory Co., Mie; Shinko Electric Co., Ltd., Tokyo, both of Japan

[21] Appl. No.: 184,551

[22] PCT Filed: Jul. 7, 1987

[86] PCT No.: PCT/JP87/00481

§ 371 Date: Apr. 14, 1988

§ 102(e) Date: Apr. 14, 1988

[87] PCT Pub. No.: WO88/00105

PCT Pub. Date: Jan. 14, 1988

[30] Foreign Application Priority Data

Jul. 7, 1986 [JP] Japan .................. 61-103857[U]
Jul. 7, 1986 [JP] Japan .................. 61-158969

[51] Int. Cl.$^4$ ............................................. B23K 11/06
[52] U.S. Cl. .................................... 219/64; 219/86.41
[58] Field of Search ................... 219/64, 117.1, 86.41

[56] References Cited

U.S. PATENT DOCUMENTS 3,632,949 1/1972 Thorne ................................ 219/64
4,144,440 3/1979 Schalch et al. ..................... 219/64
4,652,714 3/1987 Mergey et al. ..................... 219/64
4,677,272 6/1987 Tajiri ................................... 219/64

Primary Examiner—Clifford C. Shaw
Attorney, Agent, or Firm—Sughrue, Mion, Zinn, Macpeak and Seas

[57] ABSTRACT

An apparatus for seam welding is disclosed, in which a metal plate or a surface-clad metal plate in a cylindrical form with a strip-like overlap section S constituted by two overlapping edge portions is passed as process material 4 between pair roller electrodes 1 and 2 via upper and lower wire electrodes 3 for seam welding of the overlap section between the roller electrodes and also between the upper and lower wire electrodes 3 under pressure applied to the section, and also which is provided with a welding current source 8 for supplying a welding current between the roller electrodes 1 and 2. The apparatus comprises a detector disposed at a position 6a a line upstream of connecting the axes 1a and 1b of rotation of said roller electrodes for detecting at least the front end 4a said process material 4 and a control circuit 7 connected to the output side of the detector for counting the start and stop timings of supply of welding current to the roller electrodes 1 and 2 and instructing the start and stop of the welding current supply to the welding current source 8 according to the counted start and stop of the welding current supply to the welding current source 8 according to the counted start and stop timings.

3 Claims, 6 Drawing Sheets

SEAM WELDING APPARATUS WITH EDGE DETECTION

BACKGROUND OF THE INVENTION

This invention relates to an apparatus for seam welding, in which a metal plate or a surface-clad metal plate in a cylindrical form with a strip-like overlap section constituted by two overlapping edge portions is passed between pair roller electrodes via upper and lower wire electrodes for seam welding of the overlap section between the roller electrodes and also between the upper and lower wire electrodes under pressure applied to the section, and also which is provided with a welding current source for supplying a welding current between the roller electrodes.

It is well known in the art that a weld zone having excellent leakage-proof property can be obtained by seam welding, which is a well-known process of resistance welding. For this reason, seam welding is used for the welding of liquid transportation pipes, fuel tanks, drum cans and food cans. Among various seam welding process, lap seam welding is most usual. In the lap seam welding, a process material having a cylindrical form which is made from steel plate or the like, is fed such that an overlap section constituted by two overlapping edge portions of the process material is clamped between a pair of, i.e., upper and lower roller electrodes, each of which has a disk-like shape. As the material is fed with pressure applied to the overlap section, current is passed intermittently between the upper and lower roller electrodes to effect thermal fusion and welding by joule heat produced at this time. In this welding process, a large current can be passed in a short period of time to provide an increased welding speed. For this reason, the process is suited for mass production. In addition, unlike spot welding, nuggets are formed continuously during the current supply such that adjacent nuggets overlap each other, thus forming a continuous weld zone. Therefore, the same welding permits weld joints having excellent-air and water-tightness to be obtained and is thus said to be suitable for manufacturing food cans and drink cans.

However, the food cans and drink cans are required to provide corrosion resistance with respect to the contents, such as foods, drinks or the like, so tin-plated steel sheets can be used directly as process material of the food cans and drink cans, instead of cold-rolled steel sheets. When the tin-plated steel sheet material is subjected to seam welding, by using the upper and lower roller electrodes clamping the overlap section of the tin-plated sheet therebetween, there arises a transference of tin from the surface of the overlap section that is present on the surface to the outer periphery, i.e., contact surface, of the roller electrodes, which results in a tin contamination.

To solve this problem, there has been proposed and practiced an apparatus for lap seam welding using wire electrodes, as disclosed in Japanese Patent Publication 25,213/1969. In this lap seam welding apparatus, using wire electrodes, as shown in FIG. 1, upper and lower roller electrodes 1 and 2 are supported for rotation about respective axes 1a and 2a. Wire electrodes 3 such as copper wire runs along a portion of the periphery of each of the roller electrodes 1 and 2. An overlap section S of a process material 4 having cylindrical form is guided continuously together with the wire electrodes 3 between these wire electrodes 3, by means of which a seam welding of the overlap section is effected. In this case, the upper and lower roller electrodes 1 and 2 are rotated continuously. On the outer periphery of each of the upper and lower electrodes 1 and 2, there is formed a respective guide groove. The wire electrodes 3, which are fed along each of these guide grooves to between the upper and lower roller electrodes 1 and 2, runs together with the material 4 process material 4, by using the rotation of the upper and lower roller electrodes 1 and 2. Current is applied between the upper and lower roller electrodes 1 and 2 only while the material 4 is passed between the wire electrodes 3, whereby the overlap section S is thermally fused under pressure and welded.

With the prior art seam welding apparatus, however, it is difficult to detect the leading and trailing ends Sa and Sb of the overlap section S. Further, although it is necessary to vary the supplied welding current for the leading and trailing ends Sa and Sb and intermediate portion Sc other than the ends Sa and Sc, the adjustment is very difficult. Unless the adjustment is satisfactory, the welding performance is deteriorated.

SUMMARY OF THE INVENTION

As noted above, the invention concerns an apparatus for seam welding, in which a metal plate or a surface-clad metal plate in a cylindrical from with a strip-like overlap section constituted by two overlapping edge portions is passed between a pair of roller electrodes via upper and lower wire electrodes for seam welding of the overlap section between the roller electrodes and also between the upper and lower wire electrodes under pressure applied to the section, and also which is provided with a welding current source for supplying a welding current between the welding electrodes.

One feature of the invention resides in that a detector for detecting at least the trailing end of the material being fed is provided upstream of a straight line connecting the axes of rotation of the roller electrodes, and the output side of the detector is connected to a control circuit, which counts the start and stop timings of supply of welding current to the roller electrodes and instructs the start and stop of the welding current supply to welding current source according to counted start and stop timings. Thus, a predetermined welding current is supplied only while the material passes between the pair roller electrodes to obtain satisfactory seam welding of the material.

Another feature of the invention resides in that a feeder for feeding the overlap section into between the roller electrodes by pushing the rear end of the material is provided, the feeder including a disk-like member rotatable about a shaft a slit provided in the disk-like member and a feed arm having one end mounted on the shaft, and an approach switch is provided for detecting the position of the slit, the output side of the approach switch is provided for detecting the position of the slit, the output side of the approach switch is connected to the control circuit. Thus, the material can be fed very accurately, and the ends of the material can be detected accurately and without any deviation.

A further feature of the invention resides in that an approach switch for detecting the position of the slit provided in the disk-like member of the feeder is provided such that its output side is connected to the control circuit, and a detector for detecting at least the trailing end of the material is provided at a position, which is spaced apart from the straight line connecting the axes of rotation of the roller electrodes in the direction opposite to the direction of feeding of the material by predetermined distance smaller than the length dimension of the material. Thus, it is possible to provide the detector at a position spaced apart from the neighborhood of the roller electrodes, so that a logical structure can be obtained.

A still further feature resides in that an adjusting circuit, which sets a welding current necessary for the welding of the intermediate portion of the overlap section of the material except for the opposite ends of the section and also sets a welding current necessary for welding the opposite end portions of the overlap section, is connected to the control circuit. It is thus possible to hold the current necessary for the welding of the intermediate portion of the overlap section to be high compared to the current for welding the end portions of the overlap section.

A yet further feature of the invention resides in that the adjusting circuit connected to the control circuit sets a welding current necessary for welding the intermediate portion of the overlap section of the material and also sets a welding current necessary for the welding of the end portions of the overlap section other than the intermediate portion. Thus, variations of welding conditions such as frequency and welding speed can be sufficiently coped with by merely adjusting the current or voltage necessary for the welding of the intermediate portion of the overlap section.

DETAILED DESCRIPTION OF THE PREFERRED EMBODIMENTS

Figure 1:
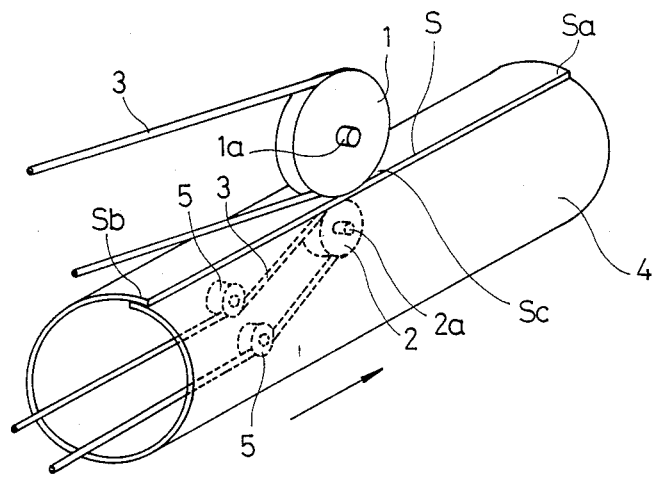
FIG. 1 is a perspective view showing a state, in which an overlap section of material is seam welded between a pair of roller electrodes via wire electrodes.
Figure 2:
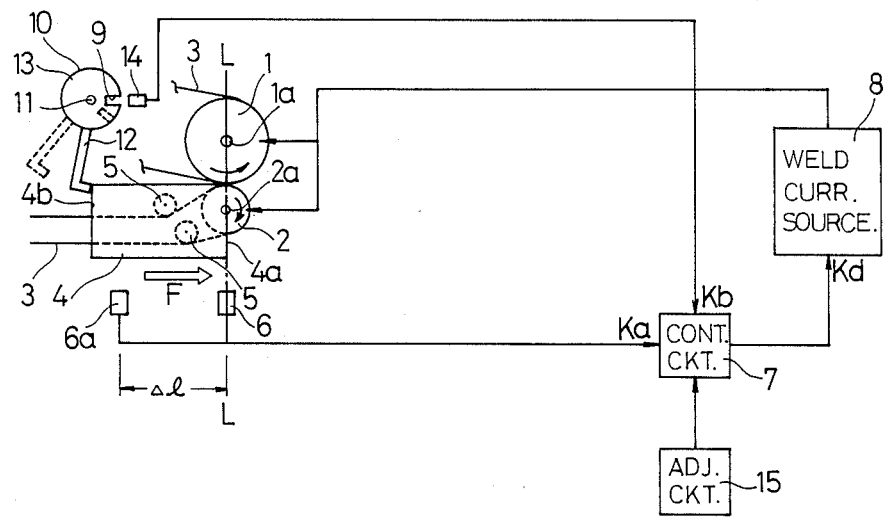
FIG. 2 is a schematic representation of an embodiment of the apparatus for seam welding according to the invention.

Referring to FIG. 2, reference numerals 1 and 2 designate disk-like roller electrodes, numeral 3 wire electrodes, numeral 4 process material, and numeral 5 wire guide rollers. Roller electrodes 1 and 2 are rotatably supported by an arm supporting mechanism (not shown) or the like. By these support mechanisms, a pressure is applied to the overlap section S of the process material A (see FIG. 1) so that the strip-like edge portions of the overlap section S are urged against each other. Further, wire electrodes 3 are pulled by the rotational force of a driving motor (not shown). By this pulling force, the roller electrodes 1 and 2 are rotated. The process material 4 consists of a metal sheet in a cylindrical form, and it is fed in the direction of arrow F. The overlap section S of the process material 4 is clamped between the roller electrodes 1 and 2 via upper and lower wire electrodes 3.

Owing to detecting the leading end 4a and trailing end 4b of the process material 4, it is impossible to provide a detector 6, e.g., an approach switch, on a line L connecting the axes of shafts 1a and 2a of the upper and lower roller electrodes 1 and 2, shown in FIG. 2, due to structural reasons. To this end, according to this invention, the detector is disposed at a position 6a spaced upstream from the line L by distance $\Delta l$, instead of disposing the detector at a position 6 containing the line L. Detector 6 or 6a supplies a detection signal to a control circuit 7. A welding current is supplied from a welding current source circuit 8 to be applied between the upper and lower roller electrodes 1 and 2. The flow rate of the welding current is decided according to an instruction from the control circuit 7.

Figure 3:
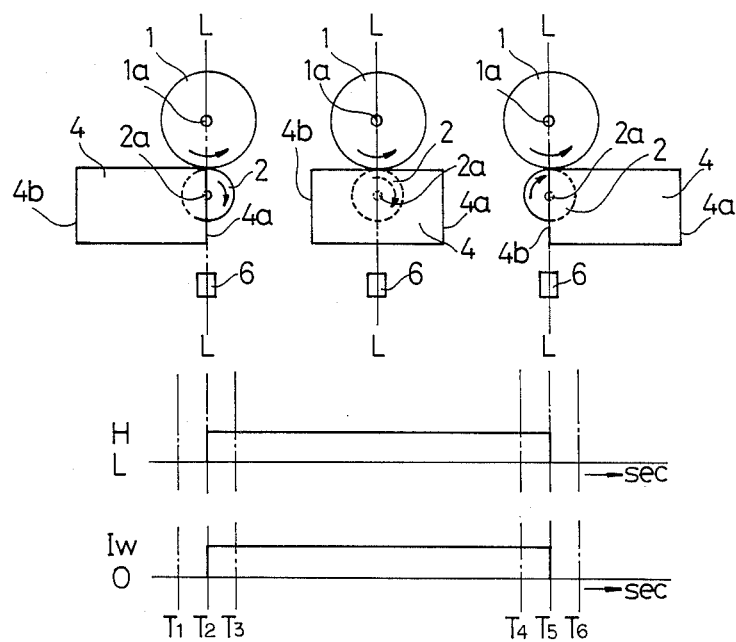
FIG. 3 shows the manner of detection of the ends of material in the seam welding apparatus according to the invention, with an illustration of end detection process shown in an upper portion, and a detection signal and a welding current corresponding to the end detection process shown in a lower portion.

The control circuit 7 effects a control of the welding current supplied from the welding current source circuit 8 to between the roller electrodes 1 and 2, according to the detection signal supplied from the detector 6. In other words in FIG. 3, the uppermost drawing shows the position of the process material 4 with respect to the roller electrodes 1 and 2, the intermediate graph shows the detection signal of the detector 6 corresponding to the position of process material 4, and the lowermost graph shows the corresponding welding current passed through the process material 4. Shown at $T_1$ is a time instant before the leading end 4a of the process material 4 reaches the welding start line L connecting the axes of the shafts 1a and 2a of the roller electrodes 1 and 2, i.e., $T_2$ is a time instant when the leading end 4a passes through the welding start line L, $T_3$ is a time instant after the leading end 4a passes through the welding start line L, $T_4$ is a time instant before the trailing end 4b of the process material 4 reaches the welding start line L, $T_5$ is a time instant when the trailing end 4b reaches the welding start line L, and $T_6$ is a time instant after the trailing end 4b reaches the welding start line L. Accordingly, if the detector is disposed in the position 6, shown in FIG. 2, when the leading end 4a of the process material 4 reaches the welding start line L between the roller electrodes 1 and 2, it is detected by the detector disposed in the position 6. At the instant $T_2$, the output of the detector disposed in the position 6 rises from "L" level to "H" level. At the instant $T_5$ of reaching of the welding start line L by the trailing end 4b of the process material 4, the output of the detector disposed in the position 6 goes to the "L", i.e., zero, level. While the detection signal at "H" level is supplied from the detector disposed in the position 6, the control circuit 7 supplies to the welding current source circuit 8 an instruction to provide a welding current Iw having a predetermined level. Thus, during a period from instant $T_2$ till instant $T_5$, welding current Iw is applied between the roller electrodes 1 and 2, and the welding current is supplied from the welding current source circuit 8 while and only while the process material 4 passes between the upper and lower roller electrodes 1 and 2.

However, where the detector is provided on the positon 6 containing the welding start line L, there occurs a structural trouble. Namely, a mechanism for maintaining a constant overlap with of the overlap section S of the process material 4 and also a mechanism for supporting the roller electrodes 1 and 2 are provided in the neighborhood of the welding start line L. Therefore, the provision of the detector on the position 6 included in the welding start line L leads to structural and design-wise troubles and problems. And, according to this invention, detector such as an approach switch is provided a position 62 shown by a dashed line in FIG. 2, spaced apart by a distance Δl from the welding start line L. The position 6a is free from structural problems. At the same time, a feeder 10 is constructed such that it consists of a disk-like member 13 having a rotatable shaft 11 and a feed arm 12 having its one end connected to the rotatable shaft 11. Further, a detection slit 9 is provided on the disk-like member 13 of the feeder 10, and an approach switch 14 is provided in relation to the detection slit 9. The position of the detection slit 9 is detected by the approach switch 14, and the detection signal therefrom is supplied to the control circuit 7.

More specifically, when the detector is disposed at a position 6a shown by dashed lines in FIG. 2, i.e., a position spaced apart by distance Δl in the direction opposite to the direction F of feeding the process material 4 from the welding start line L and when the feeder 10 is constructed by the feed arm 12 and the disk-like member 13, the leading end 4a reaches the welding start line L at an instant after the lapse of a predetermined period of time from the detection of the leading end 4a of the process material 4 by the detector disposed at the position 6a. Namely, when the feeder 10 consists of a chain conveyer supporting at spaced location feed elements which feed the process material to the roller electrodes, as shown in prior art, the period from an instant when the leading end 4a of the process material 4 being fed by the chain conveyer is passed by the detector disposed in the position 6a shown by the dashed lines till an instant when the leading end 4a reaches the welding start line L, cannot be held constant, even if the distance Δl is constant. In detail, if such conventional chain conveyer transports the process material to between roller electrodes, a slip phenomenon occurs before the leading end of the process material reaches to the welding start line L. Occurrence of such slip leads to reduction and variation of feed speed of the process material. In other words, when the leading end 4a of the process material 4 is clamped between the upper and lower roller electrodes 1 and 2, it receives resistance. Since the resistance varies with the individual cases, the rate of reduction of the speed feed of the process material 4 is varied, so that the period noted above can not be held constant. In consequence, a deviation is produced between the timing of reaching of the welding start line L by the leading end 4a of the process material 4 and the timing the start of supply of the welding current between the roller electrodes 1 and 2. In this case, it is difficult to effect welding under proper welding conditions.

On the country, in case the feeder 10 consists of the rotatably supported shaft 11, feed arm 12 provided on the shaft 11 and disk-like member 13 rotated by the shaft 11, as shown in FIG. 2, with the rotation of the feed arm 12 from the position shown by the dashed lines to the position shown by the solid lines in FIG. 2, the process material 4 is pushed at a constant speed, by the feed arm 12 having its free end contacting with the trailing end 4b of the process material 4. Thus, the overlap section S is led between the roller electrodes 1 and 2. The feeding of the process material 4 at a constant speed can be effected by the rotation of the disk-like member 13 and the feed arm 12. The disk-like member 13 of the feeder 10 is formed at a predetermined position with a slit 9. The feeding of the process material 4 thus is obtained as the position of the slit 9. An approach switch 14 is provided in the neighborhood of the disk-like member 13 for detecting a position of the slit 9. When the leading end 4a of the process material 4 reaches the welding start line L, the approach switch 14 detects the position of the slit thereby the time when the leading end 4a reaches line L. When the switch 14 detects the slit 9, the switch 14 provides a "L" level detection signal.

The detector 6a which detects the process material 4, i.e., the leading end 4a and trailing end 4b of the material 4, is disposed at a position shown by the dashed lines, spaced apart from the welding start line L in the direction opposite to the direction F of feeding of the process material 4 by a predetermined distance Δl smaller than the length dimension of the process material 4. The control circuit 7 generally consists, generally, of a timer or logic circuit. The control circuit 7 calculates the start and stop timings of supply of welding current to the roller electrodes 1 and 2 according to detection signals Ka and Kb provided respectively from the detector 6a and approach switch 14. According to these timings, it produces a welding current supply pattern, process the welding current is gradually increased during a period preset by a setter from zero to a predetermined value, then held at a predetermined value, and then gradually reduced during a period preset by the setter from the predetermined value to zero. According to this supply pattern, it instructs the welding current source circuit 8 to provide the welding current.

Now, the operation in case when the detector is moved by distance Δl to the position 6a shown by dashed lines in FIG. 2 will be described with reference to the timing diagrams of FIGS. 4(a), 4(b), 4(c), 4(d) and 4(e).

Figure 4:
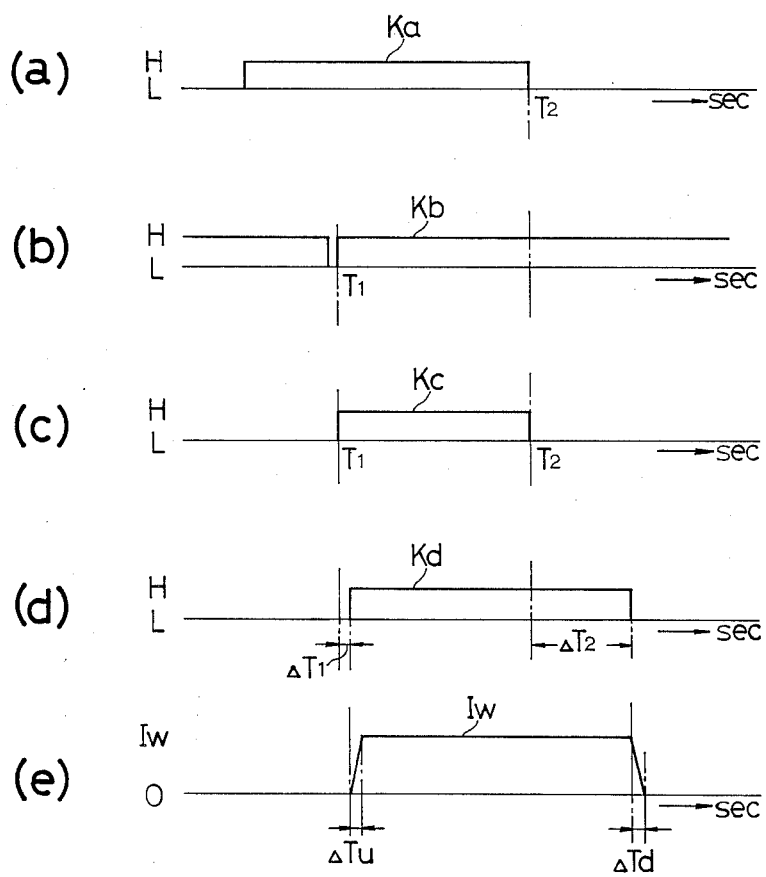
FIGS. 4(a), (b), (c), (d) and (e) are time chart diagrams for explaining the process of controlling the welding current or the like in the seam welding apparatus shown in FIG. 2.

FIG. 4(a) shows a detection signal Ka of the detector 6a, FIG. 4(b) shows a detection signal Kb of an approach switch 14, FIG. 4(c) shows a signal Kc obtained from the detection signals ka and Kb, FIG. 4(d) shows a signal Kd obtained from the signal Kc, and FIG. 4(e) shows a pattern of supply of welding current Iw obtained according to the signal Kd.

The detection signal Ka provided from the detector 6a rises from "L" level to "H" level when the leading end 4a of the process material 4 reaches a position above the detector 6a and is returned to "L" level at the instant $T_2$ when the trailing end 4b of the process material 4, passes the detector 6a (see FIG. 4(a)). The detection signal Kb provided from the approach switch 14 goes to "L" level at the instant $T_1$ when the leading end 4a of the process material 4 reaches a position between the roller electrodes 1 and 2 and then is immediately returned to "H" level (see FIG. 4(b)). In the control circuit 7, a signal Kc, which is at "H" level during a period from the instant $T_1$ till the instant $T_2$, is obtained according to the detection signals Ka and Kb (see FIG. 4(c)), and then a signal Kd is obtained, which goes to "H" level at an instant after the lapse of a preset time $\Delta T_1$ from the instant $T_1$, and goes to "L" level at an instant after the lapse of a preset time $\Delta T_2$ from the instant $T_2$, according to the signal Kc (see FIG. 4(d)). It is possible to obtain the instant of reaching of the position between the roller electrodes 1 and 2 by the leading end 4a of the process material 4 and the instant of reaching of the position between the roller electrodes 1 and 2 by the trailing end 4b of the process material 4 accurately by adjusting the preset times $\Delta T_1$ and $\Delta T_2$ to suitable values. More specifically, the instant of reaching of the position between the roller electrodes 1 and 2 by the leading end 4a of the process material 4 is obtained from an instant after the lapse of a suitable preset time $\Delta T_1$ for correcting the error detection from the instant of inversion of the detection signal Kb of the approach switch 14 to "L" level. The instant of reaching of the position between the roller electrodes 1 and 2 by the trailing end 4b of the process material 4, is obtained from the instant after the lapse of a preset time $\Delta T_2$ corresponding to the time of movement of the process material 4 by distance $\Delta 1$ from the instant of inversion of the detection signal Ka of the detector 6a to "L" level. Subsequent to the instant when the process material 4 is no longer detected by the detector 6a, the material 4 is clamped between the roller electrodes 1 and 2 to be moved at a constant speed same as the rotational speed of the roller electrodes 1 and 2 by strongly receiving the restraining forces of the roller electrodes 1 and 2. Thus, at an instant after the lapse of a predetermined period $T_2$ of time from the instant when the material 4 is no longer detected by the detector 6a, it can be regarded that the trailing end 4b of the process material 4 has reached the position between the roller electrodes 1 and 2. Thus, the preset times $\Delta T_1$ and $\Delta T_2$ can be set to suitable values by a setter (not shown).

Now, the control circuit 7 produces a welding current supply pattern according to the signal Kd shown in FIG. 4(d) and gives the welding current source circuit 8 an instruction to provide a trapezoidal pattern welding current as shown in FIG. 4(e) according to the supply pattern. Thus, the welding current source circuit 8 provides a welding current having a pattern that is gradually increased from zero to Iw until the lapse of a preset time $\Delta Tu$ from an instant $T_1 + \Delta T_1$, then is held at the level Iw and then gradually reduced from Iw to zero until the lapse of a preset time $\Delta Td$ from an instant $T_2 + \Delta T_2$. The preset time $\Delta Tu$ and $\Delta Td$ can be suitably set by a setter (not shown).

The welding current is adapted to rise and fall with a slope at the start and stop of supply of the welding current in order that the welding current supplied to the ends of the overlap section S be held in a proper range even in case when a detection error is produced in the detector 6a and approach switch 14 or the preset values $\Delta T_1$ and $\Delta T_2$ are not proper so that the welding current start and stop timing are deviated with respect to the leading end 4a and trailing end 4b of the process material 4 are deviated.

Figure 6:
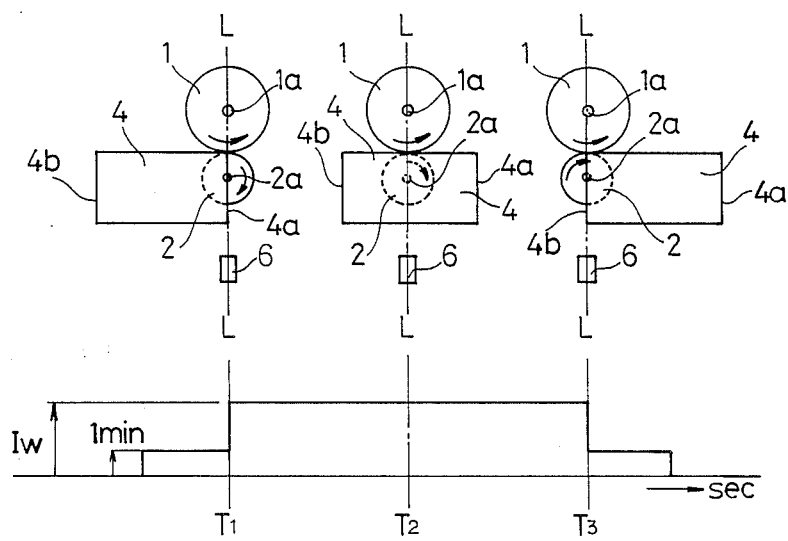
FIG. 6 shows the manner of control of the welding current in the adjusting circuits shown in FIGS. 5(a) and 5(b).

Further, when the welding current from the welding current source circuit 8 is controlled by the control circuit 7 according to the detection signals supplied thereto from the detectors 6 and 6a as shown in FIG. 2, it is possible to connect an adjusting circuit 15 to the control circuit 7 in order to adjust the welding current for the leading and trailing end portions Sa and Sb of the overlap section S and that for the intermediate portion Sc of the section S other than the end portions Sa and Sb (as shown in FIG. 1). When the adjusting circuit 15 is connected in this way, it is possible to set the welding current for the end portions Sa and Sb to a minimum value Imin and welding current for the intermediate portion Sc to a predetermined value Iw as shown in FIG. 6.

Figure 5A:
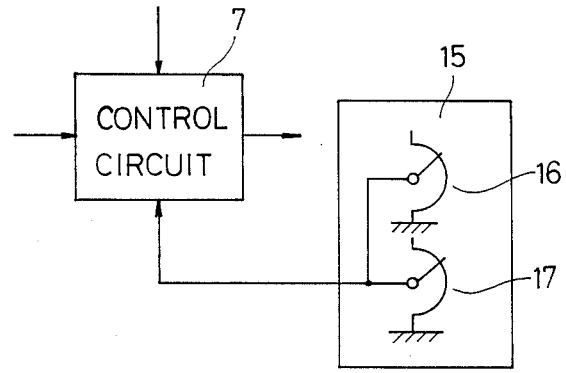
FIGS. 5(a) and 5(b) are schematic representations of respective examples of the adjusting circuit.

More particularly, the adjusting circuit 15 shown in FIG. 5(a), consists of a first setter 16 for setting a welding current Iw necessary for the welding of the intermediate portion Sc of the overlap section S other than the leading and trailing ends Sa and Sc and a second setter 17 for setting a welding current Imin for welding the leading and trailing end portions Sa and Sb. Thus, the control circuit 7 instructs the welding current source circuit 8 to provide welding current Iw and Imin preset by the first and second setters 16 and 17 in addition to the detection signals of the detectors 6 and 6a. In this case, therefore, the welding current Imin for welding the leading and trailing ends Sa and Sb of the overlap section S has to be set to lower than the welding current Iw for welding the intermediate portion Sc as shown in FIG. 6. In other words, at an instant when the leading end portion Sa of the overlap section S reaches a position somewhat ahead of the welding start line L connecting the axes of the roller electrodes 1 and 2, the leading end portion Sa is already in contact with the electrodes rollers 1 and 2 via wire electrodes 3 to cause welding current, and the resistance heat produced in junction surface flows only in the direction of the intermediate portion Sc. Further, for the end portion Sb of the overlap section S it is necessary to set the welding currents to be Iw>Imin in order to meet the welding conditions of the end portion Sb and intermediate portion Sc. In this case, with the adjusting circuit 15 having the above construction as shown in FIG. 5(a), the welding current Imin set by the second setter 17 is supplied to be between the roller electrodes 1 and 2 before the leading end 4a of the process material 4 reaches the line L connecting the axes of the shafts 1a and 2a of the roller electrodes 1 and 2, and during a period from the instant $T_1$ when the leading end 4a reaches the line L and is detected by the detection switches 6 and 6a till the instant $T_3$, the welding current Iw set by the first setter 16 is supplied, whereby the welding of the intermediate portion Sc is effected. Subsequent to the instant $T_3$ when the intermediate portion Sc passes the line L and the trailing end 4b of the process material 4 passes the line L so that it is detected by the detectors 6 and 6a, the welding current Imin is supplied again.

Figure 5B:
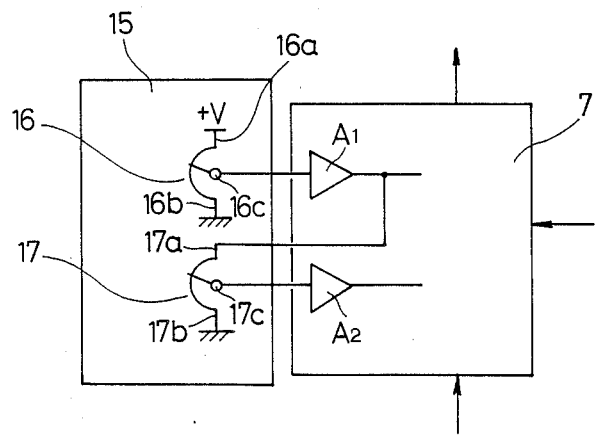

Further, the first and second setters 16 and 17 of the adjusting circuit 15 may be provided in an interlocked relation to one another as shown in FIG. 5(b) instead of providing then independently of each other as shown in FIG. 5(b).

More specifically, in adjusting circuit 15 shown in FIG. 5(a), the individual setters 16 and 17 are constructed independently of each other. Therefore, it is necessary to adjust the welding current Imin after the adjustment of the welding current Iw for the actual welding of the process material 4. This means that the operations of adjusting welding current with changes in various welding conditions are time-consuming and complicated.

In contrast, in FIG. 5(b), to set the welding current Iw, like the case of FIG. 5(a), a first fixed terminal 16a at one end of resistor in the first setter 16 which is constituted by a variable resistor, is held at a constant voltage of +V, a second fixed terminal 16b at the other end of the resistor is grounded, and a slide terminal 16c connected to slide terminal in the first setter 16 is connected to an input terminal of a buffer amplifier $A_1$ in the control circuit 7. To set the welding current Imin, in the second setter 17 constituted by a variable resistor a second fixed terminal 17b is grounded, a slide terminal 17c is connected to an input terminal of a buffer amplifier $A_2$ in the control circuit 7, but a first fixed terminal 17a is connected to the output terminal of the buffer amplifier $A_1$. The buffer amplifiers $A_1$ and $A_2$ are set such that the outputs of the first and second letters 16 and 17 are not influenced by variations of the load impedance.

When the adjustment of the first setter 16 is done with the above construction, a voltage obtained as a result of the division of the constant voltage +V as reference according to the position of the slide terminal is provided as a first preset voltage $V_1$. When the second setter 17 is adjusted, a voltage obtained as a result of the division of the first preset voltage $V_1$ provided as reference voltage from the first setter 16 according to the position of the slide terminal is provided as a second preset voltage $V_2$. Thus, when the first setter 16 is adjusted, the preset voltage $V_2$ provided from the second setter 17 is varied proportionally. In this case, the preset voltage $V_2$ has a value equal to the preset voltage $V_1$ multiplied by a given factor of 0 to 1.0. Thus, once the first and second setters 16 and 17 are adjusted to provide proper welding conditions, only the first setter 16 has to be adjusted for the adjustment of the welding current accompanying a subsequent change in the welding conditions.

INDUSTRIAL UTILITY

As has been described in detail in the foregoing, according to the invention there is provided an apparatus for seam welding, in which a metal plate or a surface-clad metal plate in cylindrical form with a strip-like overlap section constituted by two overlapping edge portions is passed between pair roller electrodes via upper and lower wire electrodes for seam welding of overlap section between the roller electrodes and also between the upper and lower wire electrodes under pressure applied to the section, and also which is provided with a welding current source for supplying a welding current between the welding electrodes, and in which a detector for detecting at least the leading end of the material being fed is provided on a straight line connecting the axes of rotation of the roller electrodes, and the output side of the detector is connected to a control circuit, which counts the start and stop timings of supply of welding current to the roller electrodes and instructs the start and stop of the welding current supply to the welding current source according to the counted start and stop timings.

Thus, the detector can accurately detect the reaching of at least the leading end of the process material to the position between the roller electrodes at all time, and as a result it is possible to provide a welding current between the roller electrodes at satisfactory timing and obtain satisfactory seam welding.

Further, the invention is applicable to any process material other than that in the cylindrical form as well so long as it has an overlap section.

What is claimed is:

1. A seam welding apparatus using wire electrodes (3) running along outer peripheries of upper and lower roller electrodes (1, 2) disposed opposed to each other, in which apparatus a cylindrical body to be welded, which has an overlap section (S) formed by overlapping either edges of a metal plate or a surface-treated metal plate, is fed together with said wire electrodes between said roller electrodes, and said overlap section is heated and partially fused by a current flowing through and between said roller electrodes, thereby seam-welding said overlap section, comprising:

(a) a feeder (10) for feeding said overlap section between said roller electrodes by pushing a trailing edge of said cylindrical body, said feeder including a disk-like member (13) rotatable about a shaft (11), a slit (9) defined in said disk-like member, and a feed arm (12) having one end mounted on said shaft and another end adapted to engage said trailing edge of said cylindrical body; and (b) an approach switch (14) for detecting the position of said slit as an indication that a leading edge of said cylindrical body is disposed at a nip between said roller electrodes.

2. A seam welding apparatus according to claim 1, further comprising:

a detector for detecting a trailing edge of said cylindrical body; and a control circuit (7) connected to an output of said detector for counting start and stop times of welding current supply to said roller electrodes and for controlling a welding current source (8) in accordance with said counted start and stop times;

said detector being disposed at a position (6a) spaced apart from a line (L) connecting the axes of rotation of said roller electrodes in a direction opposite to the direction of feeding of said cylindrical body.

3. A seam welding apparatus according to claim 2, further comprising an adjusting circuit (15) connected to said control circuit for setting welding current magnitudes for welding an intermediate portion (Sc) of said overlap section and for welding opposite end portions (Sa, Sb) of said overlap section.

* * * * *

REEXAMINATION CERTIFICATE (1680th)
United States Patent [19]

Kawano et al.

[11] B1 4,879,445

[45] Certificate Issued Apr. 14, 1992

[54] SEAM WELDING APPARATUS WITH EDGE DETECTION

[75] Inventors: Hitoshi Kawano; Mitsuhiro Hayashi; Yukio Yamamoto; Kunikatsu Ban, all of Ise, Japan

[73] Assignees: N.P.W. Technical Laboratory Co., Mie; Shinko Electric Co., Ltd., Tokyo, both of Japan

Reexamination Request:
No. 90/002,317, Apr. 12, 1991

Reexamination Certificate for:
Patent No.: 4,879,445
Issued: Nov. 7, 1989
Appl. No.: 184,551
Filed: Apr. 14, 1988

[22] PCT Filed: Jul. 7, 1987

[86] PCT No.: PCT/JP87/00481

§ 371 Date: Apr. 14, 1988

§ 102(e) Date: Apr. 14, 1988

[87] PCT Pub. No.: WO88/00105

PCT Pub. Date: Jan. 14, 1988

[30] Foreign Application Priority Data

Jul. 7, 1986 [JP] Japan .................. 61-103857
Jul. 7, 1986 [JP] Japan .................. 61-158969

[51] Int. Cl.$^5$ ........................................ B23K 11/06
[52] U.S. Cl. ............................... 219/64; 219/86.41
[58] Field of Search .............. 219/64, 117.1, 86.41

[56] References Cited

U.S. PATENT DOCUMENTS

| | | |
|---|---|---|
| 2,596,404 | 1/1951 | Holbeck . |
| 3,632,949 | 1/1972 | Thorne . |
| 4,144,440 | 3/1979 | Schalch et al. . |
| 4,574,176 | 3/1986 | Sharp . |
| 4,744,460 | 5/1988 | Pazzaglia . |

FOREIGN PATENT DOCUMENTS 2140728A 12/1984 United Kingdom .

*Primary Examiner*—Clifford C. Shaw

[57] ABSTRACT

An apparatus for seam welding is disclosed, in which a metal plate on a surface-clad metal plate in a cylindrical form with a strip-like overlap section S constituted by two overlapping edge portions is passed as process material 4 between pair roller electrodes 1 and 2 via upper and lower wire electrodes 3 for seam welding of the overlap section between the roller electrodes and also between the upper and lower wire electrodes 3 under pressure applied to the section, and also which is provided with a welding current source 8 for supplying a welding current between the roller electrodes 1 and 2. The apparatus comprises a detector disposed at a position 6a a line upstream of connecting the axes 1a and 1b of rotation of said roller electrodes for detecting at least the front end 4a said process material 4 and a control circuit 7 connected to the output side of the detector for counting the start and stop timings of supply of welding current to the roller electrodes 1 and 2 and instructing the start and stop of the welding current supply to the welding current source 8 according to the counted start and stop of the welding current supply to the welding current source 8 according to the counted start and stop timings.

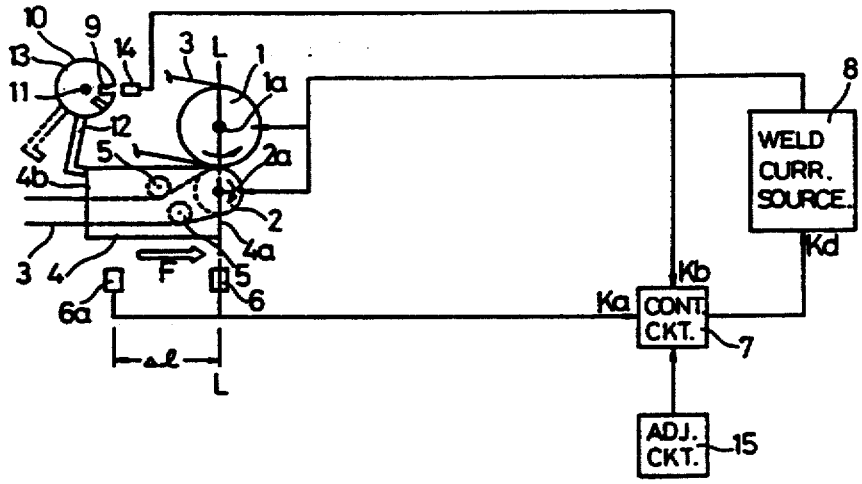

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *